The present invention relates to method of passing wires, cables and the like through walls, where a complete seal is required, even if exposed to strong pressure and/or to high temperatures.

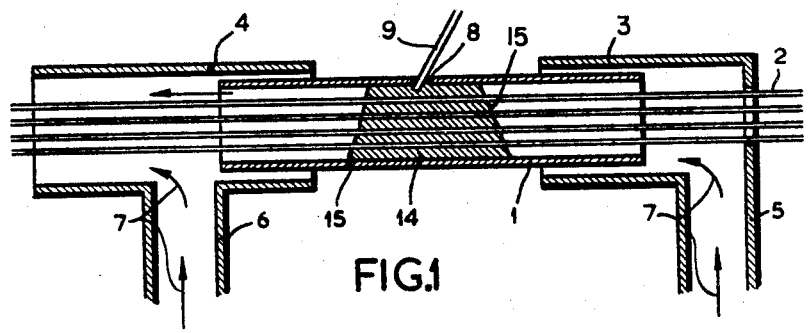
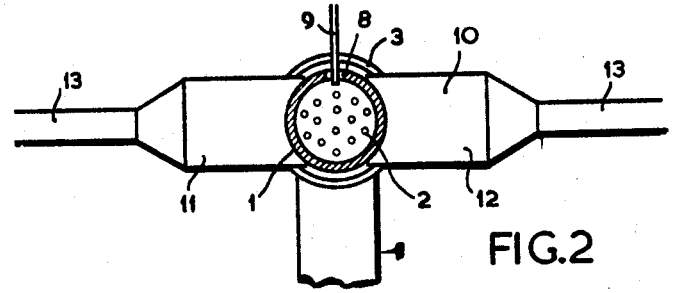
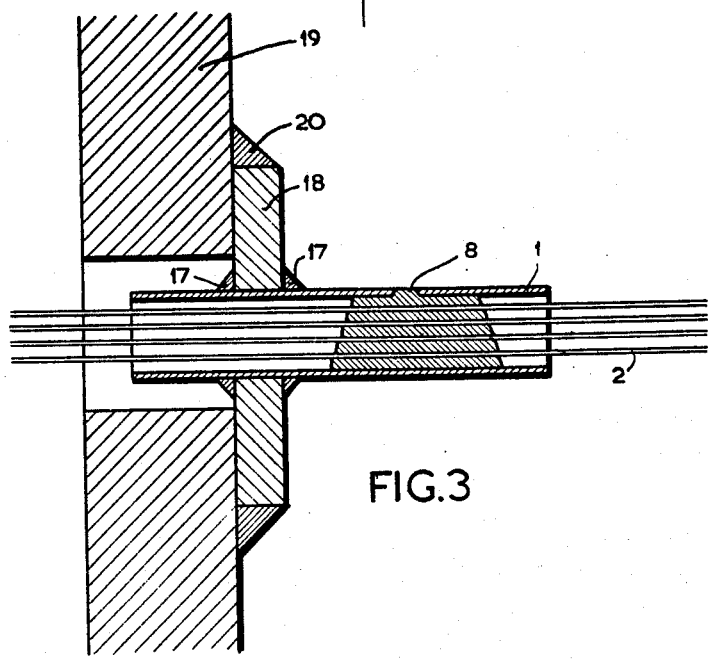
INVENTORS
PIERRE M.P. BANSARD
PIERRE A. DUJOLS
BY JEAN R. PERILHOU
AGENT 3,091,683
METHOD OF PASSING WIRE, CABLE SHEATH
AND THE LIKE THROUGH A WALL
Pierre Marcel Paul Bansard and Pierre Antoine Dujols, Paris, and Jean Robert Perilhou, Bourg-la-Reine, France, assignors to North American Philips Company, Inc., New York, N.Y., a corporation of Delaware
Filed Apr. 13, 1959, Ser. No. 806,169
Claims priority, application France May 14, 1958
7 Claims. (Cl. 219—85)

This is the case for example if the temperature, the pressure or other values of solid bodies, liquids or gases in a space are to be measured, in which a certain amount of pressure or vacuum prevails.

For measuring temperatures use may be made of coaxial or bifilar thermo-elements and for measuring pressures and for taking samples for analysis use is made of tubular ducts of suitable sectional areas.

These wires, tubes or cables which will be termed hereinafter conductors, must be taken through the walls of the pressure vessel without causing leaks.

Hitherto each of these conductors was taken through the vessel wall while the space between the conductor and the wall was closed by solder. However, it is evident that this method which can be carried out in the case of a restricted number of conductors, becomes impractical when the number is large. Moreover, the thickness of the wall to be passed through and the small diameter of the conductors should be considered.

The invention has for its object, in the first place, to provide a method which fulfills the practical requirements better than hitherto and in which a large number of conductors can be taken through more or less thick walls in a completely gas-tight manner.

The invention relates mainly to a method of passing a plurality of wire-shaped conductors through a wall, which is exposed to high pressures and/or temperatures. The said conductors are taken through the interior of a heavy gauge sleeve of such a length that, when this sleeve is fastened to the outer side of the said wall in known manner a seal is provided between the wall and the sleeve resisting the said pressure and/or temperature. Each end of the said sleeve communicates with one of the two spaces separated by the said wall while the said conductors are fastened by suitable material to the inner wall of the said sleeve so that a seal of the interstices between the conductors and the sleeve is obtained. The latter is also capable of resisting the said pressure and/or temperature.

To effect the above-mentioned latter seal the invention contemplates use of hard solder without flux to fasten the conductors to the inner wall of the sleeve. To the interior of the said sleeve and around the said wire or conductor a suitable atmosphere is circulated to avoid oxidation and corrosion of the hard solder and of the parts to be soldered. A heating element is arranged in the neighborhood of a bore provided in the side wall of the sleeve, this element melting the hard solder, which is introduced into the sleeve through the bore.

The invention will now be described more fully with reference to a drawing in which:

FIG. 1 shows a device by which the method according to the invention can be carried out. This device is shown in an axial sectional view.

FIG. 2 is a perpendicular sectional view of the device shown in FIG. 1.

FIG. 3 is a sectional view of various insertions through a wall in accordance with the invention.

The device shown by way of example is particularly suitable for obtaining gas-tight insertions of conductors through the walls of an atomic reactor, in which the materials used for such a system are to be protected from the reactions inherent therein.

The conductors which, for measuring temperatures are advantageously formed by coaxial or bifilar thermo-elements in an insulated sleeve, are secured and sealed in the sleeve by means of solder, of which the melting point is lower than that of the metals to be soldered. Heretofore soldering could be carried out successfully only by using fluxes of which the constituents often adversely affect the constituents of the reactor or the operation thereof.

A large number of those fluxes comprise fluorine which attacks for example the metal of the conductor coatings or boron, which has an excessive absorption of neutrons.

The device according to the invention reduces these disadvantages, since a desirable soldering is possible without using the said fluxes.

Referring to FIG. 1, reference numeral 1 designates the sleeve, which is, in this case, secured to the outer side of the wall by known means (for example soldering, welding or by a stuffing box method). A plurality of conductors 2 are provided in this sleeve, of which the surfaces has previously been cleaned by known means, for example acids or by mechanical means.

In accordance with one aspect of the invention the sleeve 1 is surrounded by two sockets 3 and 4, which communicate with tubes 5 and 6 respectively, through which a reducing or an inert gas, or mixture of a reducing gas and an inert gas is conveyed, which is free of water and oxygen. Use may be made, for example, of hydrogen, nitrogen, argon or a mixture of various of these gases.

In order to minimize the loss of these gases the inner diameters of sockets 3 and 4 match, as far as possible the outer diameter of the sleeve 1. The gas flows in the direction of the arrow 7.

According to a further aspect of the invention the sleeve 1 has an opening 8 through which the hard solder 9 is introduced, as will be described more fully hereinafter.

Since the conductors 2 may sometimes have a considerable length, it may be advantageous, instead of taking these conductors through the sleeve 1 and the sockets 3 and 4, to use a sleeve and sockets each divided in their directions of length into at least two portions. The portions concerned are then slipped on the conductors. The said portions are held in place during the soldering process by glands or other suitable devices. The socket may be provided to this end, as an alternative, with a common hinge in order to facilitate the connection. It is obvious that in the method according to the invention the soldering serves at the same time to connect the various portions of the sleeve.

Referring to FIG. 2 which shows the device of FIG. 1 in a perpendicular sectional view, reference numeral 10 designates the heating element (which is omitted in FIG. 1 for the sake of clarity). The element 10 comprises two carbons 11 and 12, which are fed by a suitable current during operation via the supply wires 13 and which are positioned in the proximity of the opening 8 of sleeve 1 and which may serve to hold the sleeve portions in place if the sleeve is divided into portions.

The device according to the invention is, of course, not restricted to the said heating method; use may be made of other, suitable heating methods, for example inductive heating.

The said device operates as follows. When the various parts shown in FIGS. 1 and 2 are arranged in their proper places, the protective gas is supplied, after which the carbons are switched on. When the sleeve has assumed a sufficiently high temperature to melt the hard solder, this solder is introduced through the opening 8. The molten solder flows into the interstices between the conductors 2 and into those between these conductors and the sleeve 1. When the solder leaves the zone of high temperature, indicated by hatching 14 in FIG. 1, this solder hardens and remains solid in spite of the connection with the molten solder, thus a kind of plug 15 is formed at each end of the said zone. This plug forms a kind of container for the molten solder. As soon as this container is filled up with the molten solder, which then appears at the opening 8, this phase of the method is terminated.

In practice it is found that the seal of the interstices in the interior of the sleeve is completely tight even at high pressure and at high temperatures.

Use may be made, for example of a hard solder mixture of 85% of silver and 15% of manganese; this provides a hard solder which can be used successfully, if the metal of the sleeve consists of nickel steel and that of the conductor coatings of corrosion-free steel. Then the sleeve 1 with the conductors 2 is fastened to the wall, for example, in the manner illustrated in FIG. 3. In accordance with this figure the sleeve 1 is first secured by solder 17 (hard solder or soft solder) to a round plate 18. If this connection is somewhat too near the hard-solder connection of the sleeve and the conductors, it is advantageous to use a hard solder 17 of which the melting point is lower that that of the hard solder 9 or 14. Then the round plate 18 is secured to the wall 19 by hard solder or soft solder 20. The method of fastening the sleeve 1 to the wall 19 is only given by way of example. In accordance with the invention any other method may be carried out, so long as the pressure or temperature to which the wall 19 is exposed are resisted. The connection may be obtained, for example, by means of suitable stuffing boxes (not shown).

For the invention it is not essential whether the sleeve is connected with the conductors and then with the wall 19 or conversely first with the said wall and subsequently with the conductors.

From FIG. 3 is is evident that the device shown in FIGS. 1 and 2 can be adapted to the sleeve 1, if it is first secured to the wall 19 by means of the round plate 18 and the solder 17 and 20. The conductors 2 are introduced into the sleeve connected with the wall and the sockets 3 and 4 are provided one at each end of the sleeve. The carbons 11 and 12 are arranged on the sleeve 1 one on each side of the opening 8. When the gas is supplied, the carbons are switched on and the hard solder 9 is introduced through the opening 8, as stated above.

The sleeve 1 may be secured to the wall 19 also in a different way before it is connected with the conductors 2.

The method according to the invention is not restricted to the example described above; various modifications are possible. In the case of a comparatively low pressure vessel, the hard solder 9, for example, may be replaced by a resin which has a certain degree of liquidity during the application and then hardens in air blown into the sleeve. This resin must, of course, be capable of providing a completely gas-tight seal at the pressure or temperature prevailing at the wall 19.

What is claimed is:

1. A method of forming a sealing plug within the interior of a tube in a discrete space remote from the open ends thereof; comprising providing a substantially vertical opening through a side wall of said tube whereby said discrete space within said tube and the space exterior of said tube are in communication, introducing molten sealing material to said discrete space within said tube through said opening and simultaneously supplying an inert cooling fluid to said space, and filling said space with said sealing material.

2. A method of forming a sealing plug within the interior of a tube in a discrete space remote from the ends thereof and having at least one conductor disposed longitudinally within said tube and normally protruding from the open ends thereof; comprising providing a substantially vertical opening through a side wall of said tube whereby said discrete space within said tube and the space exterior of said tube are in communication, introducing molten solder without flux to said space through said opening and simultaneously supplying a fluid to said space to solidify said solder, and filling said space with said solder.

3. A method of forming a sealing plug within the interior of a tube in a discrete space remote from the ends thereof and having at least one conductor disposed longitudinally within said tube and normally protruding from the open ends thereof; comprising providing a substantially vertical opening through a side wall of said tube whereby said discrete space with said tube and the space exterior of said tube are in communication, introducing molten hard solder without flux to said space through said opening and simultaneously continuously supplying a fluid to said space to solidify said solder, and filling said space with said solder.

4. The method according to claim 3 wherein said fluid comprises an inert gas.

5. The method according to claim 3 wherein said fluid is a reducing gas.

6. The method according to claim 3 wherein said fluid is a mixture of inert and reducing gases.

7. The method according to claim 3 wherein said fluid is supplied to said space from both ends of said tube.

References Cited in the file of this patent

UNITED STATES PATENTS

| | | |
|---|---|---|
| 1,533,270 | Reid | Apr. 14, 1925 |
| 1,952,695 | Webb et al. | Mar. 27, 1934 |
| 2,283,023 | Williams et al. | May 12, 1942 |
| 2,399,103 | Clinedinst | Apr. 23, 1946 |
| 2,499,456 | Browne | Mar. 7, 1950 |
| 2,503,429 | Ziegler | Apr. 11, 1950 |
| 2,705,768 | Kleimack | Apr. 5, 1955 |
| 2,732,421 | Chapman | Jan. 24, 1956 |
| 2,767,301 | Reichelt et al. | Oct. 16, 1956 |
| 2,891,138 | Letters | June 16, 1959 |
| 2,896,064 | Maloney | July 21, 1959 |